(12) United States Patent
Barnes et al.

(10) Patent No.: US 8,037,406 B1
(45) Date of Patent: Oct. 11, 2011

(54) DYNAMIC SCREEN GENERATION AND NAVIGATION ENGINE

(75) Inventors: James D. Barnes, Overland, KS (US); Sanjay K. Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 317 days.

(21) Appl. No.: 11/492,319

(22) Filed: Jul. 25, 2006

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 9/44 | (2006.01) |
| G06F 3/048 | (2006.01) |

(52) U.S. Cl. ........ 715/235; 717/105; 717/109; 717/113; 717/117; 715/825

(58) Field of Classification Search .............. 717/105, 717/109, 113, 111, 235, 825, 117; 715/235, 715/825
See application file for complete search history.

(56) References Cited

U.S. PATENT DOCUMENTS

| | | | |
|---|---|---|---|
| 6,083,276 | A | 7/2000 | Davidson et al. |
| 6,718,371 | B1 | 4/2004 | Lowry et al. |
| 6,845,499 | B2 | 1/2005 | Srivastava et al. |
| 2002/0038320 | A1 | 3/2002 | Brook |
| 2002/0085020 | A1 | 7/2002 | Carroll, Jr. |
| 2002/0089542 | A1* | 7/2002 | Imamura ...................... 345/764 |
| 2002/0104073 | A1 | 8/2002 | Weerawarana et al. |
| 2003/0159112 | A1 | 8/2003 | Fry |
| 2003/0167444 | A1 | 9/2003 | Zorc |
| 2004/0049737 | A1* | 3/2004 | Hunt et al. ................... 715/513 |
| 2004/0153967 | A1 | 8/2004 | Bender et al. |
| 2005/0221841 | A1 | 10/2005 | Piccionelli et al. |

(Continued)

FOREIGN PATENT DOCUMENTS

WO 9205498 4/1992

OTHER PUBLICATIONS

D. Bowman; Sliding Doors of CSS; http://www.alistapart.com/articles/slidingdoors; Oct. 20, 2003.*

(Continued)

*Primary Examiner* — Kee M Tung
*Assistant Examiner* — Carlos Perromat (57) ABSTRACT

A computer implemented system for a dynamic screen generation and navigation engine is provided. The system includes a set of screen templates, a screen data document, and a screen manager. The screen data document includes screen data for at least one screen template of the set of screen templates. The screen manager includes a generator engine and a navigator engine. In response to user input, the generator engine obtains screen data from the screen data document, obtains a screen template from the set of screen templates based on the obtained screen data, combines the obtained screen data with the obtained screen template to generate a screen, and displays the generated screen. The navigator engine obtains a user selection for the generated screen, references the screen data corresponding to the obtained user selection to determine a next screen to generate, and prompts the generator engine to generate the next screen based on the referenced screen data.

20 Claims, 8 Drawing Sheets

U.S. PATENT DOCUMENTS

2008/0016466 A1* 1/2008 Grasser et al. ............ 715/835

OTHER PUBLICATIONS

E. Robson, E. Freeman; Head First HTML with CSS and XHTML; O'Reilly Media; Dec. 8, 2005.*
World Wide Web Consortium, CSS 2.1, "17. Tables", http://www.w3.org/TR/CSS21/tables.html; 26 pages; Mar. 15, 2010.*
Captain's Universe; XML-XSL Example— Tutorial; http://www.captain.at/howto-xml-xsl-example.php; dated Feb. 4, 2006.*
Collectorz.com; XSL Template Tutorial for Book Collector; http://web.archive.org/web/20030731040658/http://collectorz.com/book/xsltutorial.php; retrieved by the Web Archive Jul. 31, 2003.*
W3C; Associating Style Sheets with XML documents Version 1.0; http://www.w3.org/TR/xml-stylesheet/; dated Jun. 19, 1999.*
T. Howard; The XML Revolution; Published in Personal Computer World Magazine, May 1998.*
T. Marston; Generating a tree view using XSL and XML; http://www.tonymarston.net/xml-xsl/xml-and-xsl-treeview.html; dated Aug. 26, 2004.*
S. Pemberton; XML Events for HTML Authors; http://www.w3.org/MarkUp/2004/xmlevents-for-html-authors; dated Jul. 21, 2004.*
E.R. Harold; XML Bible, Second Edition, Chapter 18; Wiley; Jun. 1, 2001.*
Fabio Arciniegas; What is XLink; http://www.xml.com/pub/a/2000/09/xlink/index.html; dated Sep. 2000; retrieved Dec. 1, 2010.*
Anonymous, Word HTML 2 Formatting Objects; http://classic-web.archive.org/web/20021011092955/wh2fo.sourceforge.net/index.html; retrieved by the Web Archive Oct. 2002.*
Patent application entitled "XML-Based Application Factory," filed Jul. 17, 2002, U.S. Appl. No. 10/196,922.
Lee, Sangdon, et al., "XML-based Retrieval of Object-oriented Frameworks," 2000, IEEE, pp. 2953-2958.
Buxmann, Peter, et al., "XML-Based Supply Chain Management—as Simplex as it is-," 2002, IEEE, pp. 2179-2188.
Zdun, Uwe, "Dynamically Generating Web Application Fragments From Page Templates", ACM, 2001, pp. 1113-1120.
Office Action dated Apr. 21, 2005, 12 pages, U.S. Appl. No. 10/196,922, filed Jul. 17, 2002.
Final Office Action dated Oct. 28, 2005, 25 pages; U.S. Appl. No. 10/196,922, filed Jul. 17, 2002.
Advisory Action dated Jan. 26, 2006, 3 pages, U.S. Appl. No. 10/196,922, filed Jul. 17, 2002.
Office Action dated Mar. 28, 2006, 28 pages, U.S. Appl. No. 10/196,922, filed Jul. 17, 2002.
Final Office Action dated Sep. 25, 2006, 7 pages, U.S. Appl. No. 10/196,922, filed Jul. 17, 2002.
Advisory Action dated Jan. 3, 2007, 3 pages, U.S. Appl. No. 10/196,922, filed Jul. 17, 2002.
Office Action dated Apr. 19, 2007, 15 pages, U.S. Appl. No. 10/196,922, filed Jul. 17, 2002.
Final Office Action dated Oct. 4, 2007, 8 pages, U.S. Appl. No. 10/196,922, filed Jul. 17, 2002.
Notice of Abandonment dated Apr. 14, 2008, 2 pages, U.S. Appl. No. 10/196,922, filed Jul. 17, 2002.
"3 Conformance: Requirements and Recommendations," Mar. 2, 2010, 5 pages, http://www.w3.org/TR/CSS21/conform.html.
"17 Tables," Mar. 2, 2010, 2 pages, http://www.w3.org/TR/CSS21/tables.html.
"16.4 Letter and Word Spacing: the 'letter-spacing' and 'word-spacing' properties," Mar. 2, 2010, 2 pages, http://www.w3.org/TR/CSS21/text.html.
"4.1.7 Rule sets, declaration blocks, and selectors," 2 pages, Mar. 2, 2010, http://www.w3.org/TR/CSS21/syndata.html.
"Cascading Style Sheets Level 2 Revision 1 (CSS 2.1) Specification," Mar. 2, 2010, 19 pages, http://www.w3.org/TR/CSS21/cover.html.

* cited by examiner

Fig. 1

Best Available Copy

DYNAMIC SCREEN GENERATION AND NAVIGATION ENGINE

CROSS-REFERENCE TO RELATED APPLICATIONS

This application includes subject matter related to the following application, which is hereby incorporated by reference:

U.S. patent application Ser. No. 10/196,922, filed Jul. 17, 2002, entitled "XML-Based Application Factory," by Qi Liu, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software developers commonly use an integrated development environment (IDE) to develop software with a graphical user interface. The IDE may enable developers to create screens for display by the software, and may enable developers to write software code to specify actions for the software to take in response to user inputs. However, developing screens in this manner is tedious and time-consuming, particularly for applications having dynamic interfaces. The software developer has to know a programming language, such as JAVA, to write code to generate screens and to enable a software user to navigate between the screens. To modify the appearance of a screen or to change navigation between screens, the software developer must change software code and then recompile the changed code.

SUMMARY

Accordingly, there is provided herein systems and methods for dynamic screen generation and navigation. The system includes a set of screen templates, a screen data document, and a screen manager. The screen data document includes screen data for at least one screen template of the set of screen templates. The screen manager includes a generator engine and a navigator engine. The generator engine obtains screen data from the screen data document. The generator engine also obtains a screen template from the set of screen templates based on the obtained screen data. Additionally, the generator engine combines the obtained screen data with the obtained screen template to generate a screen. Furthermore, the generator engine displays the generated screen. The navigator engine obtains a user selection for the generated screen. The navigator engine also references the screen data corresponding to the obtained user selection to determine a next screen to generate. Additionally, the navigator engine prompts the generator engine to generate the next screen based on the referenced screen data.

In another embodiment, a computer implemented method for dynamic screen generation and navigation is provided. Screen data is obtained from a screen data document. A screen template is obtained from a set of screen templates based on the obtained screen data. The obtained screen data is combined with the obtained screen template to generate a screen. The generated screen is displayed. A user selection is obtained for the generated screen. The screen data corresponding to the obtained user selection is referenced to determine a next screen to generate. The next screen is generated based on the referenced screen data. Based on a user selection for a screen subsequently generated, the screen data is modified for the screen template to personalize the screen for the user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Using an integrated development environment (IDE) to develop screens that may be displayed on a mobile device is tedious and time-consuming. Furthermore, the software developer has to know a programming language, such as JAVA, to write code to enable a mobile device user to navigate between the screens. Embodiments of the present disclosure provide a screen manager that combines screen templates and a screen data document to generate screens and navigate between the screens. The screen data document eliminates the need for the software developer to know a programming language. Because no coding is involved, a software developer with limited software development skills may quickly provide all the information needed for generating screens and navigating between the screens by writing data to the screen data document, a text document. The software developer may avoid problems with differing device characteristics of differing remote devices by developing screens using screen templates, which may adjust image sizes, the number of menu items, and other visual resources on a screen based on a mobile device's characteristics. Thus, with the benefit of the present disclosure, the software developer can quickly generate and maintain a series of screens that form a dynamic menu tree, enabling a mobile device user to browse through and select from a large range of changing options. Additionally, embodiments of the present disclosure enable changes to the appearance of screens and the navigation between screens without requiring any changes to code written in a programming language or even any code written in a programming language.

For example, the software developer may write "New Today" and "screen 3" to the screen data document. This text document may enable the screen manager to display "New Today" in a screen for purchasing different types of music and to both generate and navigate to a screen for purchasing different types of new music if the mobile device user selects "New Today." In another example, if the mobile device user purchases hip-hop music from the screen for purchasing different types of new music, new data may be written to the text document. The next time the mobile device user selects "New Today," the screen manager may navigate to a different screen for purchasing new hip-hop music.

Figure 1:
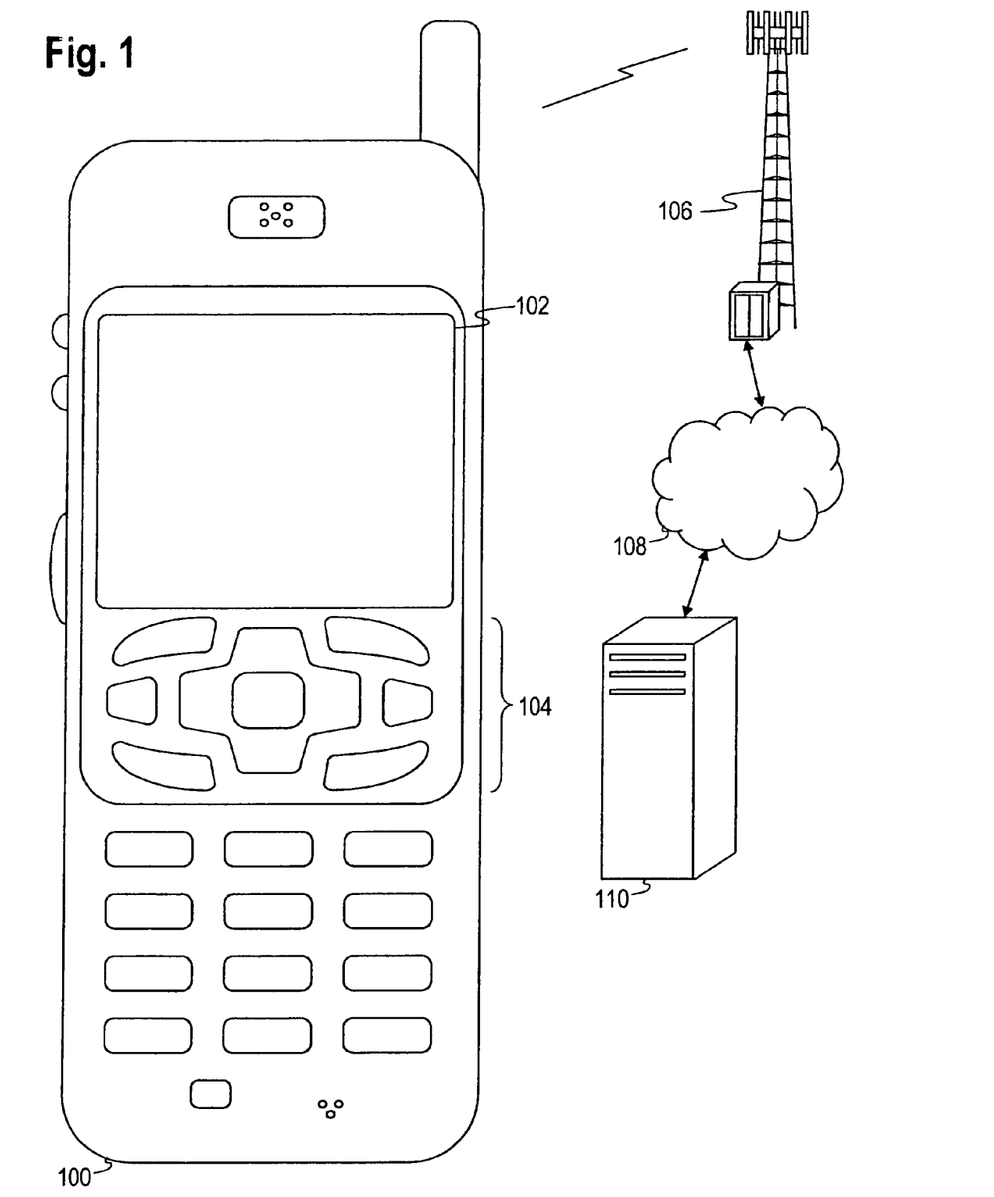
FIG. 1 shows an illustrative wireless communications system.

FIG. 1 shows a wireless communications system including an illustrative mobile device 100. Though illustrated as a mobile phone, the mobile device 100 may take various forms including a personal digital assistant (PDA), a mobile computer, a digital camera, a digital music player, a digital calculator, and an electronic key fob for keyless entry. Many suitable mobile devices combine some or all of these functions. In some preferred implementations, the mobile device is not a general purpose computing device like a notebook or tablet computer, but rather is a special-purpose communications device such as a mobile phone, a pager, or a PDA.

The mobile device 100 includes a display 102 and a touch-sensitive surface or keys 104 with which to interact with a user. The mobile device 100 may present options for the user to select, controls for the user to actuate, and/or cursors or other indicators for the user to direct. The mobile device 100 may further accept data entry from the user, including numbers to dial or various parameter values for configuring the operation of the mobile device 100. The mobile device 100 may further execute one or more software or firmware applications in response to user commands. These applications may configure the mobile device 100 to perform various customized functions in response to user interaction.

Among the various applications executable by the mobile device 100 are a web browser, which enables the display 102 to show a web page. The web page is obtained via wireless communications with a cell tower 106 or a wireless network access node. The cell tower 106 (or wireless network access node) is coupled to a wired network 108, such as the Internet. Via the wireless link and the wired network, the mobile device 100 has access to information on various servers, such as a server 110. The server 110 may provide content that may be shown on the display 102.

Figure 2:
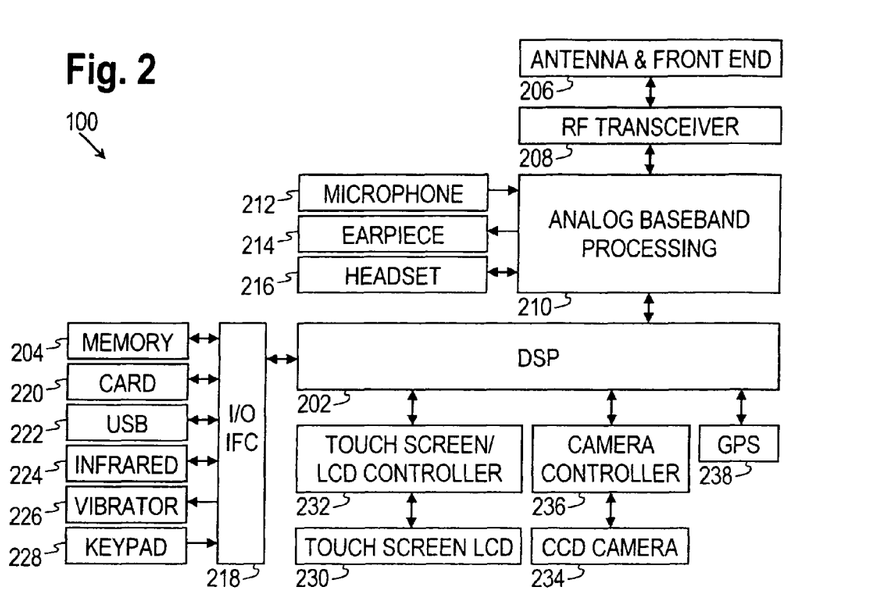
FIG. 2 shows a block diagram of an illustrative mobile device.

FIG. 2 shows a block diagram of the mobile device 100. The mobile device 100 includes a digital signal processor (DSP) 202 and a memory 204. As shown, the mobile device 100 may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared port 224, a vibrator 226, a keypad 228, a liquid crystal display (LCD) with a touch sensitive surface 230, a touch screen/LCD controller 232, a charge-coupled device (CCD) camera 234, a camera controller 236, and a global positioning system (GPS) sensor 238.

The DSP 202 or some other form of controller or central processing unit operates to control the various components of the mobile device 100 in accordance with embedded software or firmware stored in the memory 204. In addition to the embedded software or firmware, the DSP 202 may execute other applications stored in the memory 204 or made available via information carrier media such as portable data storage media like the memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 may be provided to convert between wireless signals and electrical signals, enabling the mobile device 100 to send and receive information from a cellular network or some other available wireless communications network. The RF transceiver 208 provides frequency shifting, e.g., converting received RF signals to baseband and converting baseband transmit signals to RF. The analog baseband processing unit 210 may provide channel equalization and signal demodulation to extract information from received signals, may modulate information to create transmit signals, and may provide analog filtering for audio signals. To that end, the analog baseband processing unit 210 may have ports for connecting to the built-in microphone 212 and the earpiece speaker 214 that enable the mobile device 100 to be used as a cell phone. The analog baseband processing unit 210 may further include a port for connecting to a headset or other hands-free microphone and speaker configuration.

The DSP 202 may send and receive digital communications with a wireless network via the analog baseband processing unit 210. In some embodiments, these digital communications may provide Internet connectivity, enabling a user to gain access to content on the Internet and to send and receive e-mail or text messages. The input/output interface 218 interconnects the DSP 202 and various memories and interfaces. The memory 204 and the removable memory card 220 may provide software and data to configure the operation of the DSP 202. Among the interfaces may be the USB interface 222 and the infrared port 224. The USB interface 222 may enable the mobile device 100 to function as a peripheral device to exchange information with a personal computer or other computer system. The infrared port 224 and other optional ports such as a Bluetooth interface or an IEEE 802.11 compliant wireless interface may enable the mobile device 100 to communicate wirelessly with other nearby mobile devices and/or wireless base stations. In some contemplated systems, the mobile device 100 is able to wirelessly exchange information at a point-of-sale when placed near a suitable transceiver.

The input/output interface 218 may further connect the DSP 202 to the vibrator 226 that, when triggered, causes the mobile device 100 to vibrate. The vibrator 226 may serve as a mechanism for silently alerting the user to any of various events such as an incoming call, a new text message, and an appointment reminder.

The keypad 228 couples to the DSP 202 via the I/O interface 218 to provide one mechanism for the user to make selections, enter information, and otherwise provide input to the mobile device 100. Another input mechanism may be the touch screen display 230, which may also display text and/or graphics to the user. The display controller 232 couples the DSP 202 to the touch screen display 230.

The CCD camera 234 enables the mobile device 100 to take digital pictures. The DSP 202 communicates with the camera 234 via the camera controller 236. The GPS sensor 238 is coupled to the DSP 202 to decode global positioning system signals, thereby enabling the mobile device 100 to determine its position. Various other peripherals may also be included to provide additional functions, e.g., radio and television reception.

Figure 3:
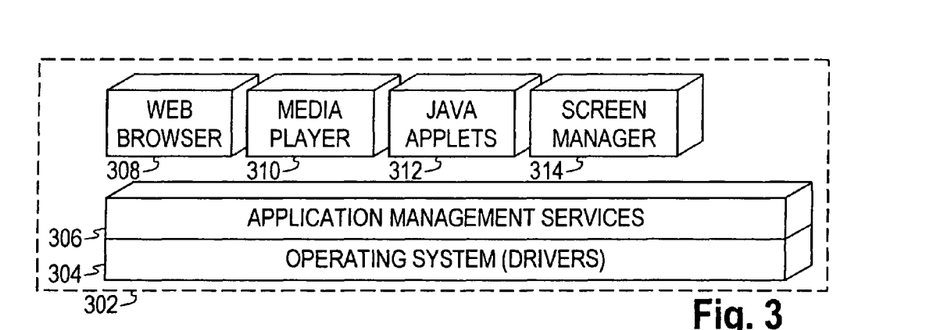
FIG. 3 shows a diagram of an illustrative software configuration for a mobile device.

FIG. 3 illustrates a software environment 302 that may be implemented by the DSP 202. The DSP 202 executes operating system software 304 that provides a platform from which the rest of the software operates. The operating system software 304 provides drivers for the mobile device hardware with standardized interfaces that are accessible to application software. The operating system software 304 includes an application management system ("AMS") 306 that transfers control between applications running on the mobile device 100. Also shown in FIG. 3 are a web browser application 308, a media player application 310, JAVA applets 312, and a screen manager 314. The web browser application 308 configures the mobile device 100 to operate as a web browser, allowing the user to enter information into forms and select links to retrieve and view web pages. The media player application 310 configures the mobile device to retrieve and play audio or audiovisual media. The JAVA applets 312 may configure the mobile device 100 to provide games, utilities, and other functionality.

The screen manager 314 is a component (or in some embodiments, a stand-alone application) that dynamically generates screens and enables dynamic navigation between screens. For the sake of brevity, this disclosure describes that the screen manager 314 obtains user input from the keys 104, but the screen manager 314 may also obtain user input from the keypad 228 or the liquid crystal display (LCD) with a touch sensitive surface 230 through the touch screen/LCD controller 232. As a component, the screen manager may be called by the web browser, JAVA applets, or other software. As a stand-alone application, the screen manager may be packaged with a set of templates and screen data files, and may be invoked directly by the user. In response to user input, the screen manager 314 may display additional screens as described below, or may invoke other applications such as the web browser application 308 or the media player application 310. The screen manager 314 may directly generate and display screens on the display 102, or the screen manager 314 may prompt the web browser application 308 or the media player application 310 to display screens on the display 102.

Figure 4:
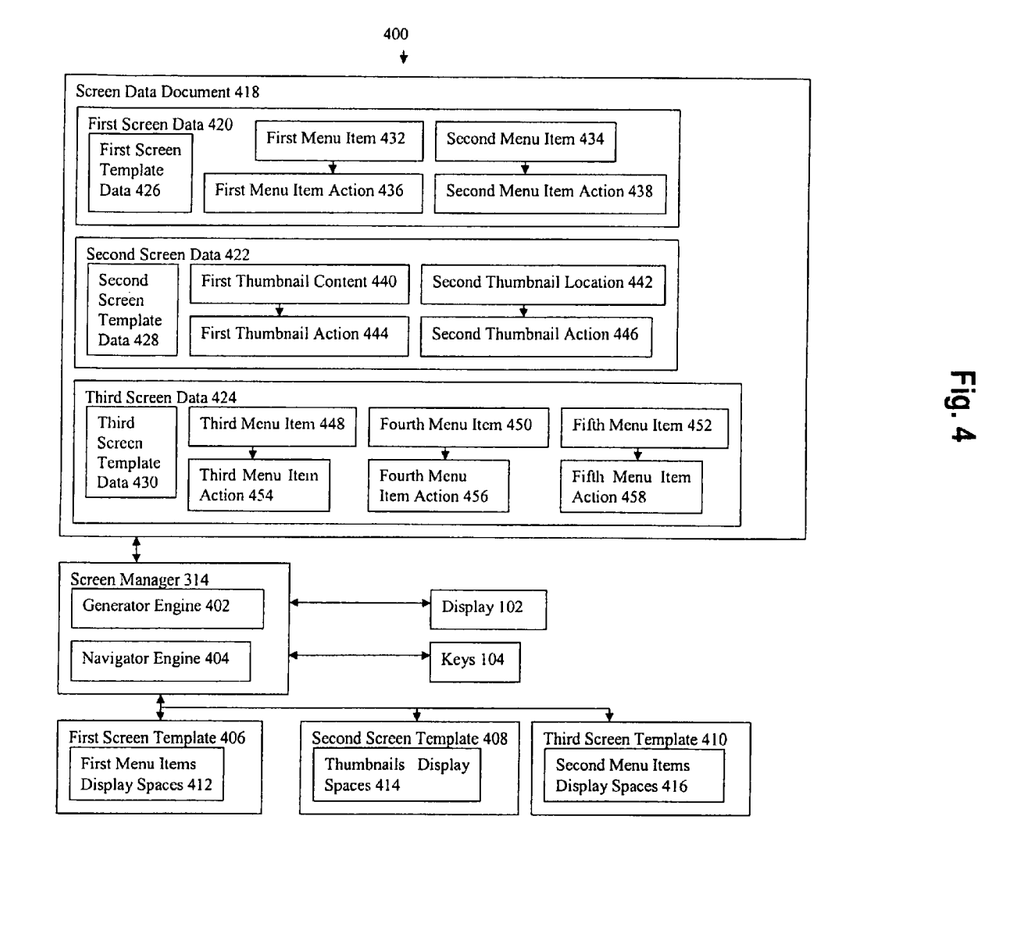
FIG. 4 shows an illustrative system for a dynamic screen generation and navigation engine according to an embodiment of the present disclosure.

Turning now to FIG. 4, an illustrative system 400 for a dynamic screen generation and navigation engine is depicted. The system 400 includes the screen manager 314, which includes a generator engine 402 to generate screens and a navigator engine 404 to navigate between generated screens. A screen is a set of visual data output to a mobile device user through the display 102. The generator engine 402 is a component that dynamically generates screens to display on the display 102. The navigator engine 404 is a component that dynamically navigates between screens based on input from the keys 104. Although illustrated separately, the generator engine 402, the navigator engine 404, and their functions may be associated or combined with one another in any combination.

The system 400 also includes a set of screen templates, which includes a first screen template 406, a second screen template 408, and a third screen template 410. Three screen templates are shown for the purpose of an illustrative example only, as the set of templates may include any number of screen templates. A screen template is a set of visual data with slots or spaces for information, and it is used to specify format and layout of generated screens.

The generator engine 402 uses the set of screen templates to generate screens displayed on the display 102. Each screen template in the set of screen templates includes a variable number of display spaces that may be used by the generator engine 402 for displaying data. A display space is an area reserved for representing data on a screen. For example, the first screen template 406 includes first menu items display spaces 412, the second screen template 408 includes thumbnails display spaces 414, and the third screen template 410 includes second menu items display spaces 416. Each set of display spaces may display a variable amount of data, with each individual display space displaying a distinct set of data. For example, the first menu items display spaces 412 may display any number of menu items. The generator engine 402 may resize the first menu items display spaces 412 in the first screen template 406 to make the display spaces smaller, which enables the display 102 to display a large number of display spaces, with each display space containing data. In another example, first screen template 406 adds a scroll bar to the display of the second menu items display spaces 416 in the third screen template 410 to enable the display 102 to display a large number of display spaces, with each display space containing data. A scroll bar is a graphical device used to change a view for a mobile device user of the contents of a screen.

The system 400 also includes a screen data document 418 to provide screen data to the generator engine 402 for generating screens based on the set of screen templates. Static screen data is information that is fixed at compile time, prior to the operation of the system 400. Dynamic screen data is information that is changeable, such as elements which can change within a system while the system is operating, without the need for re-compiling. In some embodiments of the present disclosure, the screen data document 418 is a text file that includes sets of dynamic information that are changeable without the need for re-compiling. Dynamic screen generation is the creation of a graphic user interface based upon a changeable text file without the need for re-compiling the text file. Dynamic screen navigation is the moving around within a system of graphic user interfaces based upon a changeable text file without the need for re-compiling the text file. Navigation may be changing from one screen to another screen based upon user input.

The screen data document 418 includes the first screen data 420, the second screen data 422, and the third screen data 424. Three sets of screen data are shown for the purpose of an illustrative example only, as the screen data document 418 may include any number of sets of screen data. Each set of screen data includes screen template data that specifies which screen template is used for displaying the set of screen data. For example, first screen template data 426 specifies which screen template is used for displaying the first screen data 420, second screen template data 428 specifies which screen template is used for displaying the second screen data 422, and third screen template data 430 specifies which screen template is used for displaying the third screen data 424.

Each set of screen data also includes discrete data that is displayed in the screen template specified by the screen template data. For example, the first screen data 420 includes a first menu item 432 and a second menu item 434. Two menu items are shown for the purpose of an illustrative example only, as each set of screen data may include any number of menu items. The first menu item 432 is associated with a first menu item action 436, which is an action to take when a mobile device user uses the keys 104 to select the first menu item 432. Likewise, the second menu item 434 is associated with a second menu item action 438, which is an action to take when the mobile device user uses the keys 104 to select the second menu item 434.

Similarly, the second screen data 422 includes a first thumbnail content 440 and a second thumbnail location 442. A thumbnail is a reduced-size version of an image used to make it easier for a mobile device user to scan and recognize images, serving the same role for images as a normal text index does for words. Two thumbnails are shown for the purpose of an illustrative example only, as each set of screen data may include any number of thumbnails. The first thumbnail content 440 includes content for a thumbnail, whereas the second thumbnail location 442 specifies where content for a thumbnail is located. The first thumbnail content 440 is associated with a first thumbnail action 444, which is an action to take when a mobile device user uses the keys 104 to select the first thumbnail content 440. Likewise, the second thumbnail location 442 is associated with a second thumbnail action 446, which is an action to take when the mobile device user uses the keys 104 to select the second thumbnail location 442.

Similar to the first screen data 420, the third screen data 424 includes a third menu item 448, a fourth menu item 450, and a fifth menu item 452. Also similar to the first screen data 420, each menu item is associated with a menu item action, such as a third menu item action 454, a fourth menu item action 456, and a fifth menu item action 458. Each menu item action is an action to take when a mobile device user uses the keys 104 to select the associated menu item.

Figure 5:
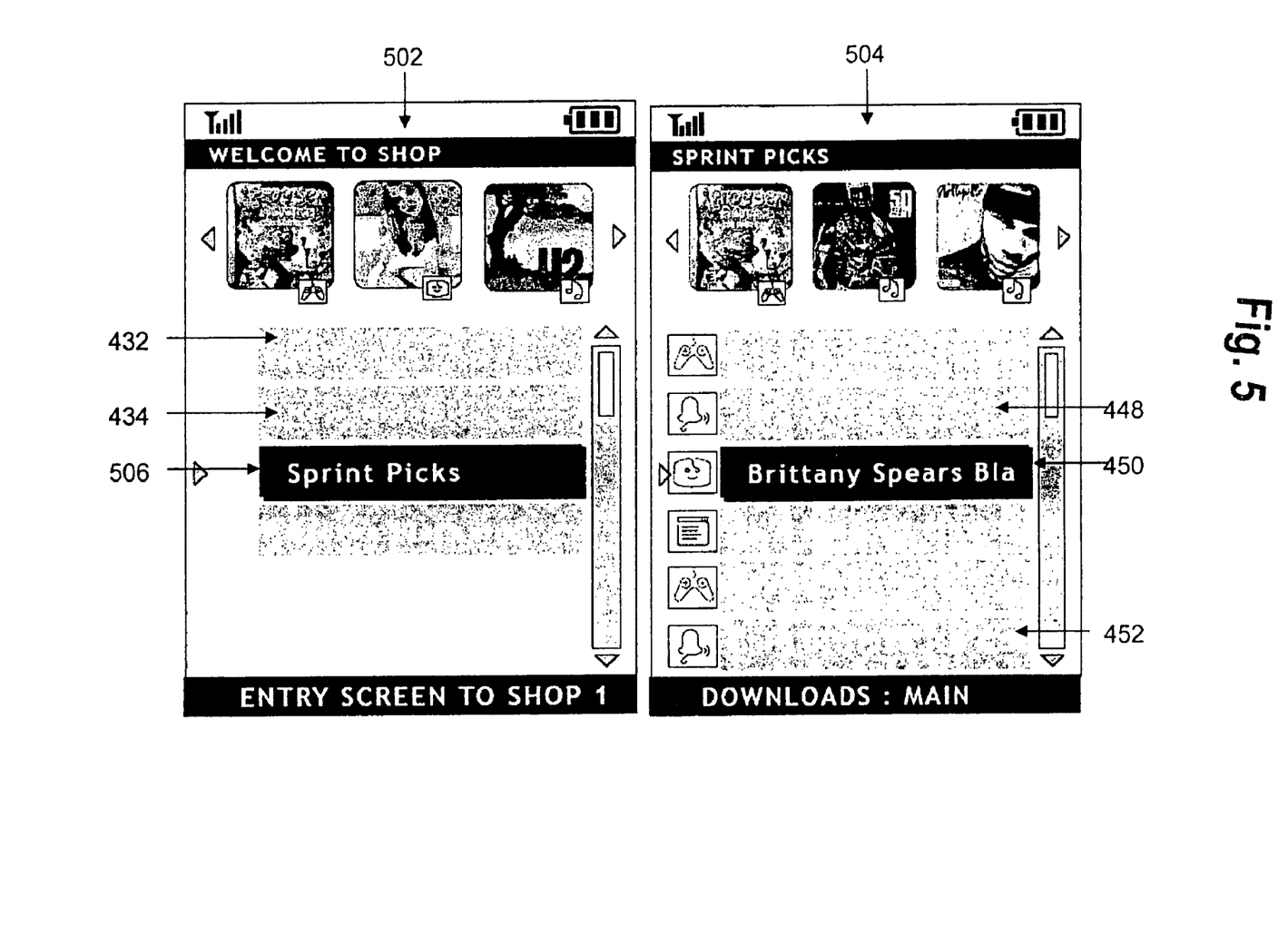
FIG. 5 shows illustrative screens for a mobile device according to an embodiment of the present disclosure.

Turning now to FIG. 5, illustrative screens are depicted for a mobile device according to an embodiment of the present disclosure. A first screen 502 and a second screen 504 are examples of screens generated by the generator engine 402 by writing screen data from the screen data document 418 to screen templates from the set of screen templates. The first screen 502 includes the first menu item 432, the second menu item 434, and an additional menu item 506 for the purpose of an illustrative example only, as each screen may include any number of menu items. For example, the first screen 502 may be a screen for purchasing music, the first menu item 432 may enable a mobile device user to view popular music that is available for purchase, the second menu item 434 may enable the mobile device user to view new music that is available for purchase, and the additional menu item 506 may enable the mobile device user to view suggested music that is available for purchase. Continuing this example, if the mobile device user selects the second menu item 434, the navigator engine 404 references the corresponding second menu item action 438 to determine a next screen to generate, such as the second screen 504. The second screen 504 may include selections for new music and ring-tones that are available for purchase, such as the third menu item 448, the fourth menu item 450, and the fifth menu item 452. Further to this example, if the mobile device user selects the fourth menu item 450 to purchase new hip-hop music, the navigator engine 404 references the corresponding fourth menu item action 456 to determine a next screen to generate, such as a screen confirming purchase of the new hip-hop music.

Figure 6:
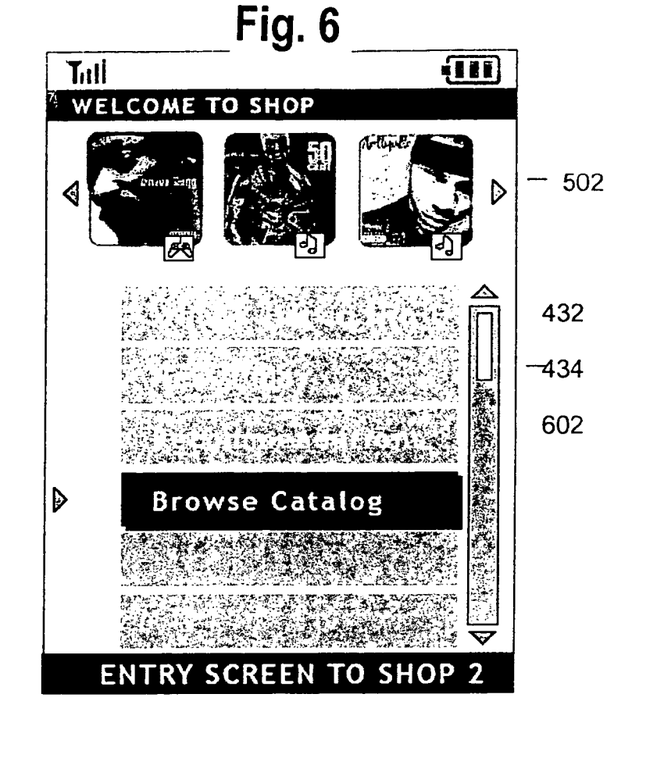
FIG. 6 shows an illustrative modified screen for a mobile device according to an embodiment of the present disclosure.

Turning now to FIG. 6, an illustrative modified screen is depicted for a mobile device according to an embodiment of the present disclosure. In contrast to the depiction of the first screen 502 in FIG. 5, FIG. 6 depicts a modified version of the first screen 502. The modified version of the first screen 502 in FIG. 6 is similar to the first screen 502 in FIG. 5, but an option is different based on the user selections described in FIG. 5. Although the first screen 502 still includes the first menu item 432 to view popular music available for purchase and the second menu item 434 to view new music that is available for purchase, the first screen 502 also includes a sixth menu item 602, which may enable a mobile device user to view recommendations for hip-hop music that is available for purchase. The replacement of the additional menu item 506 with the sixth menu item 602 is based on the example user selections described in FIG. 5, which resulted in the mobile device user purchasing hip-hop music. The user selections which resulted in the mobile device user purchasing hip-hop music also modified the dynamic data for the first screen 502. Based on the modified dynamic data, now when the first screen 502 is generated, the generator engine 402 displays the sixth menu item 602 as the third option for the first screen 502. Further to this example, if the mobile device user selects the sixth menu item 602 for recommendations to purchase hip-hop music, the navigator engine 404 references a corresponding menu item action to determine a next screen to generate. The modified dynamic data specifies the next screen to generate in response to the selection of the sixth menu item 602 may be a screen of recommendations for purchasing hip-hop music. The generator engine 402 generates the screen of recommendations for purchasing hip-hop music, which enables the mobile device user to navigate to the screen of recommendations for purchasing hip-hop music.

Figure 7:
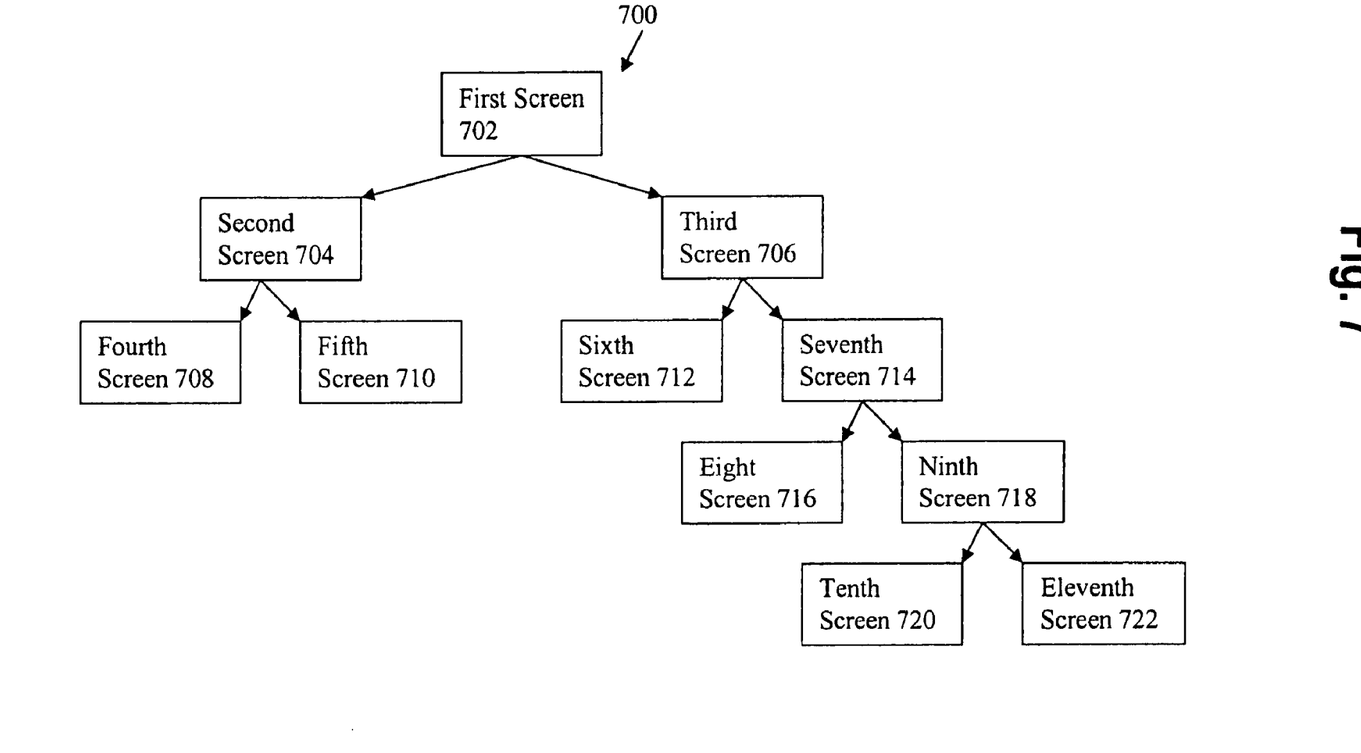
FIG. 7 shows an illustrative navigation tree for a dynamic screen generation and navigation engine according to an embodiment of the present disclosure.

FIG. 7 shows an illustrative navigation tree 700 for a dynamic screen generation and navigation engine according to an embodiment of the present disclosure. A tree is an information graph in which any two points on the information graph are connected by exactly one path. The navigation tree 700 depicts a sequence of potential navigation from screen to screen and what options of subsequent screens may be available from each screen. For example, a first screen 702 may provide the options of generating either a second screen 704 or a third screen 706. The navigation tree 700 depicts screens that offer at most two options for generating additional screens as an example only, as each screen may offer any number of options for generating additional screens. Continuing this example, the second screen 704 may provide the options of generating either a fourth screen 708 or a fifth screen 710, while the third screen 706 may provide the options of generating either a sixth screen 712 or a seventh screen 714. The seventh screen 714 may provide the options of generating either a eighth screen 716 or a ninth screen 718, while the ninth screen 718 may provide the options of generating either a tenth screen 720 or an eleventh screen 722. The navigation tree 700 may depict a sequence of screen navigation pre-determined by a software developer. However, a user selection may modify the dynamic data for a screen template, such that the screen based on the modified dynamic data for the screen template may offer different navigation options, without the need for recompiling any code. Modification of dynamic data may modify the navigation tree 700.

Figure 8:
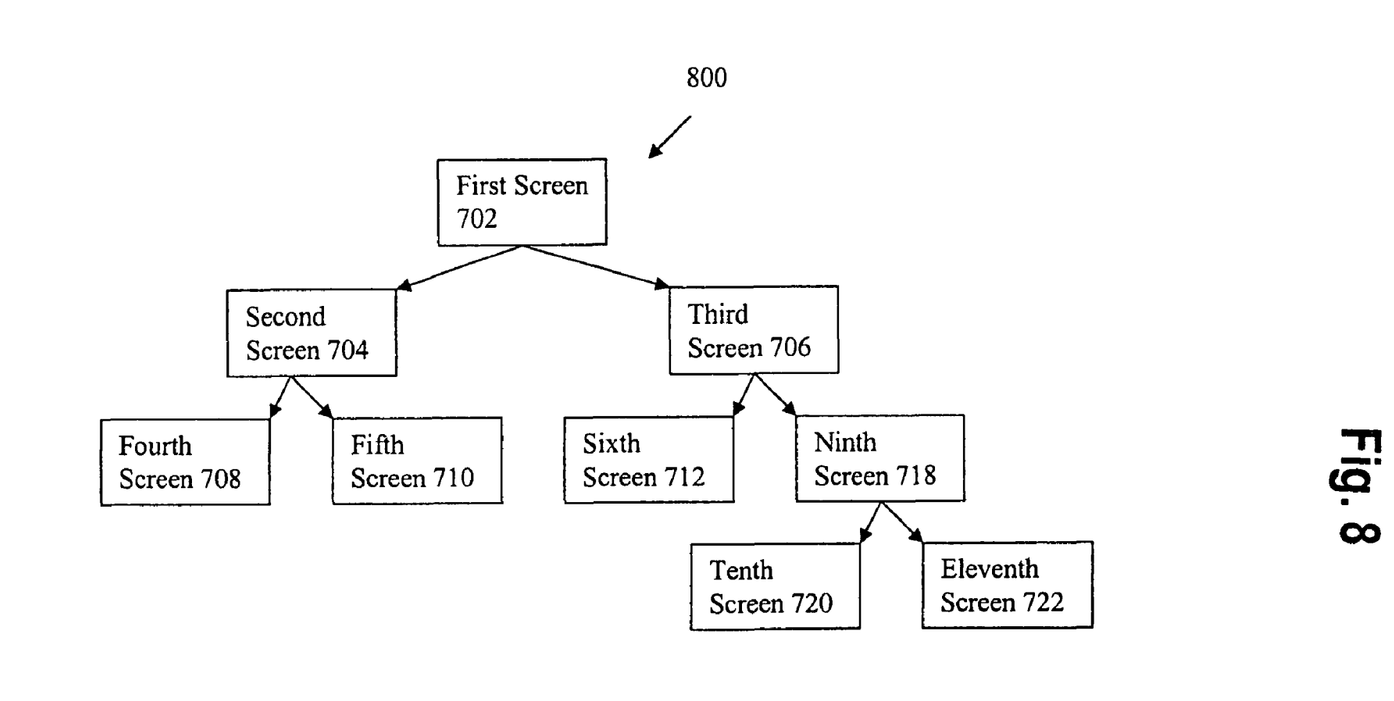
FIG. 8 shows an illustrative modified navigation tree for a dynamic screen generation and navigation engine according to an embodiment of the present disclosure.

FIG. 8 shows an illustrative modified navigation tree 800 for a dynamic screen generation and navigation engine according to an embodiment of the present disclosure. The modified navigation tree 800 may be similar to the navigation tree 700 in FIG. 7, but with some different navigation options based on modified dynamic data. For example, the navigation tree 800 depicts substantially the same sequence of potential navigation from screen to screen and what options of subsequent screens may be available from each screen for the screens 702-712.

However, a user selection may modify the dynamic data for a screen template for the third screen 706, such that the third screen 706 may offer different navigation options, the sixth screen 712 and the ninth screen 718, based on the modified dynamic data. The third screen 706 may not offer the previous navigation option of the seventh screen 714, having replaced the option of the seventh screen 714 with the option of the ninth screen 718, based on modified dynamic data. The third screen 706 bypasses the option of the seventh screen 714 to directly offer the option of the ninth screen 718, previously an option available from the seventh screen 714 only after selecting the option of the seventh screen 714 from the third screen 706.

An example of a screen bypassing one option for another option is depicted in FIG. 5 and FIG. 6. The third option for the first screen 502 in FIG. 5 is the additional menu item 506, but in FIG. 6 the additional menu item 506 is replaced by the sixth menu item 602. The sixth menu item 602 may have been available after selecting the additional menu item 506 and traversing a navigation tree, such as the navigation tree 700. However, when the mobile device user purchased hip-hop music, as described in FIG. 5, the user selections modified the dynamic data for the first screen 502. Following the modification of dynamic data, if the mobile device user selects the new third option on the first screen 502, the navigator engine 404 references a modified dynamic data to determine a next screen to generate, and generates the screen of recommendations for purchasing hip-hop music. The modification of dynamic data enables the mobile device user to bypass selecting the additional menu item 506 and traversing a navigation tree by offering navigation directly to the screen of recommendations for purchasing hip-hop music.

Figure 9:
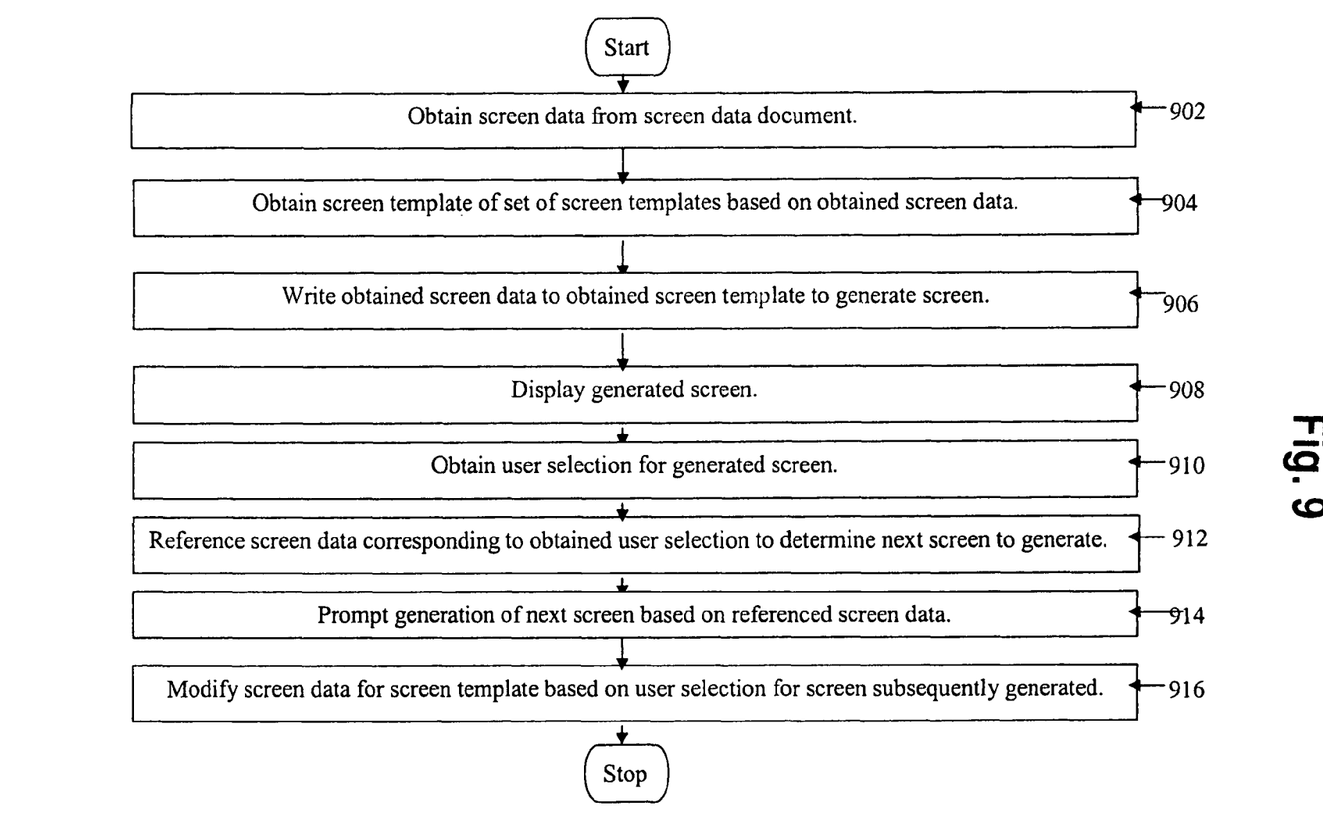
FIG. 9 shows an illustrative method for a dynamic screen generation and navigation engine according to an embodiment of the present disclosure.

FIG. 9 shows an illustrative method for a dynamic screen generation and navigation engine according to an embodiment of the present disclosure. Execution of the method enables a screen manager to combine screen data from a screen data document with a screen template from a set of screen templates to generate screens and navigate between the screens.

In box 902, screen data is obtained from the screen data document 418. For example, the generator engine 402 may obtain the first screen data 420 from the screen data document 418.

In box 904, a screen template of the set of screen templates is obtained based on the obtained screen data. For example, the generator engine 402 may obtain the first screen template 406 based on the first screen template data 426, part of the first screen data 420.

In box 906, the obtained screen data is written to the obtained screen template to generate a screen. For example, the generator engine 402 may write the first menu item 432 and the second menu item 434, both from the first screen data 420, to the first menu items display spaces 412 in the first screen template 406.

In box 908, the generated screen is displayed. For example, the generator engine 402 displays a generated screen based on the first screen template 406 and the first screen data 420 on the display 102.

In box 910, a user selection is obtained for the generated screen. For example, the navigator engine 404 may detect a user selection from the keys 104 for the generated screen displayed on the display 102.

In box 912, screen data corresponding to the obtained user selection is referenced to determine a next screen to generate. For example, the navigator engine 404 may reference the second menu item action 438 corresponding to the user selection for the second menu item 434. The second menu item action 438 specifies an action to take, such as generating a next screen based on the third screen data 424.

In box 914, generation of the next screen is prompted based on the referenced screen data. For example, the navigator engine 404 may prompt the generator engine 402 to generate a next screen based on the third screen data 424.

In box 916, screen data is modified for the screen template based on the user selection for a screen subsequently generated. For example, the navigator engine 404 may respond to a user selection from the keys 104 for the second menu item 434 to generate the second screen 504 to view new music that is available for purchase. Then the navigator engine 404 may detect the user selection from the keys 104 for the fourth menu item 450 from the second screen 504 to purchase new hip-hop music. In response to the user selection to purchase new hip-hop music, the navigator engine 404 may modify the first screen data 420 to add the sixth menu item 602, which may enable a mobile device user to view hip-hop music that is available for purchase. Alternatively, the navigator engine 404 may respond to the user selection to purchase new hip-hop music by modifying the first screen data 420. The navigator engine 404 may specifically modify the first menu item action 436, which previously enabled a mobile device user to view a screen for popular musical available for purchase, to enable a mobile device user to view a screen of recommendations for hip-hop music that is available for purchase. By modifying screen data in the screen data document 418, the navigator engine 404 may modify screen data that is displayed on the display 102 and may modify a navigation tree, with both modifications based on user selections from the keys 104.

Figure 10:
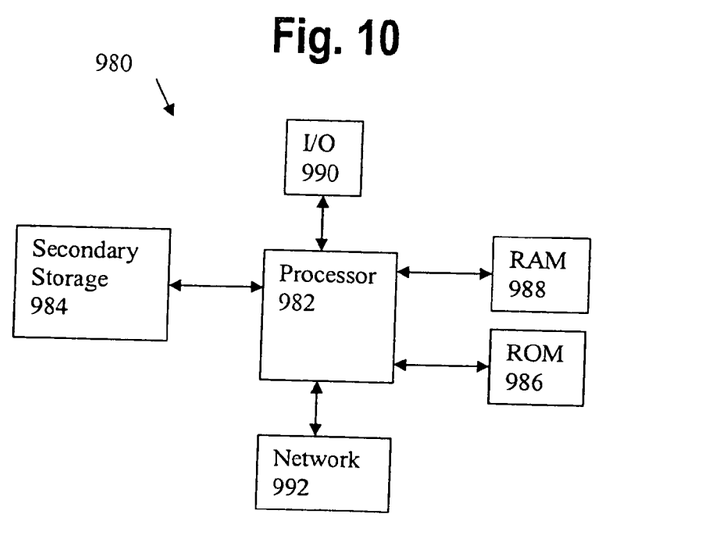
FIG. 10 shows an illustrative general purpose computer system suitable for implementing the several embodiments of the disclosure.

The system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity 992 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented system for a dynamic screen generation and navigation engine, comprising:
    a set of screen templates, wherein each screen template is a preset screen template;
    a screen data document comprising screen data for multiple screens, wherein the screen data document comprises screen data for multiple screen templates of the set of screen templates, and wherein the screen data comprises sets of screen data, each set of screen data comprising screen template data, one or more menu items, and a menu item action associated with each of the one or more menu items;
    a screen manager comprising a generator engine and a navigator engine,
    wherein the generator engine is operable, in response to user input, to:
        obtain a set of screen data from the screen data document, wherein the set of screen data comprises corresponding screen template data and a corresponding one or more menu items, wherein the corresponding screen template data specifies which screen template of the set of screen templates is used for displaying the corresponding one or more menu items;
        obtain a screen template specified by the corresponding screen template data from the set of screen templates, wherein the screen template comprises a set of visual display spaces with slots for displaying the corresponding one or more menu items;
        write the corresponding one or more menu items from the screen data document into the slots of the obtained screen template to generate a screen; and
        display the generated screen with the corresponding one or more menu items displayed in the set of visual display spaces; and
    wherein the navigator engine is operable to:
        obtain a user selection of a menu item displayed on the generated screen;
        reference the set of screen data in the screen data document to identify a menu item action corresponding to the obtained user selection of the menu item, and
        prompt the generator engine to implement the corresponding menu item action identified from the screen data document.

2. The computer implemented system of claim 1 wherein each screen template in the set of screen templates comprises a variable number of display spaces for the discrete screen data.

3. The computer implemented system of claim 2 wherein the screen manager is further operable to resize the variable number of display spaces for the discrete screen data.

4. The computer implemented system of claim 1 wherein the screen data in the screen data document specifies a location where other screen data is obtained for the set of screen templates.

5. The computer implemented system of claim 1 wherein the navigator engine is further operable to modify the screen data for the screen template based on a user selection for a screen subsequently generated.

6. The computer implemented system of claim 5 wherein modifying the screen data for the screen template modifies a navigation tree.

7. A computer implemented method for dynamic screen generation and navigation, comprising:
    obtaining first screen data from a screen data document, wherein the screen data document comprises screen data for multiple screens, wherein the screen data document comprises screen data for multiple screen templates of a set of screen templates, wherein each screen template is a preset screen template, wherein the first screen data comprises a first screen template data and a first set of discrete screen data, and wherein the first screen template data specifies which screen template of the set of screen templates is used for displaying the first set of discrete screen data;

obtaining a first screen template specified by the first screen template data from the set of screen templates, wherein the first screen template comprises a set of visual display spaces with slots for displaying the first set of discrete screen data;

writing the first set of discrete screen data from the screen data document into the slots of the obtained screen template to generate a first screen;

displaying the generated first screen with the first set of discrete screen data displayed in the set of visual display spaces;

obtaining a user selection for the generated first screen;

referencing the screen data document to obtain second screen data corresponding to the obtained user selection to determine a second screen to generate;

prompting generation of the second screen based on the second screen data obtained from the screen data document, wherein the second screen data obtained from the screen data document comprises a second screen template data and a second set of discrete screen data, and wherein the second screen template data specifies which screen template of the set of screen templates is used for displaying the second set of discrete screen data; and modifying the first screen data for the first screen template based on a user selection for the second screen subsequently generated.

8. The computer implemented method of claim 7 wherein the set of screen templates comprises a variable number of display spaces for the discrete screen data.

9. The computer implemented method of claim 8 further comprising resizing the variable number of display spaces for the discrete screen data.

10. The computer implemented method of claim 7 wherein modifying the first screen data for the first screen template modifies a navigation tree.

11. The computer implemented method of claim 7 wherein the screen data in the screen data document specifies a location where other screen data is obtained for the set of screen templates.

12. The computer implemented method of claim 7 wherein modifying the first screen data for the first screen template based on the user selection for the second screen subsequently generated modifies the generated first screen.

13. The computer implemented method of claim 7 wherein modifying the first screen data for the first screen template based on the user selection for the second screen subsequently generated modifies the determination of a next screen to generate.

14. The computer implemented method of claim 7 wherein the set of discrete screen data comprises one or more menu items and a menu item action corresponding to each of the one or more menu items.

15. The computer implemented method of claim 14 wherein the screen data document is referenced to identify the menu item action corresponding to the obtained user selection to implement, and wherein the generator engine is prompted to implement the identified menu item action in order to generate the second screen.

16. A computer implemented system for a dynamic screen generation and navigation engine, comprising:
a set of screen templates, wherein each screen template is a preset screen template;
a screen data document comprising screen data for multiple screens, wherein the screen data document comprises screen data for multiple screen templates of the set of screen templates;
a screen manager comprising a generator engine and a navigator engine,
wherein the generator engine is operable, in response to user input, to:
obtain first screen data from the screen data document, wherein the first screen data comprises a first screen template data and a first set of discrete screen data, wherein the first screen template data specifies which screen template of the set of screen templates is used for displaying the first set of discrete screen data;
obtain a first screen template specified by the first screen template data from the set of screen templates, wherein the first screen template comprises a set of visual display spaces with slots for displaying the first set of discrete screen data;
write the first set of discrete screen data of the screen data document into the slots of the obtained first screen template to generate a first screen; and
display the generated first screen with the first set of discrete screen data displayed in the set of visual display spaces; and
wherein the navigator engine is operable to:
obtain a user selection for the generated first screen;
reference the screen data document to obtain second screen data corresponding to the obtained user selection to determine a second screen to generate;
prompt the generator engine to generate the second screen based on the second screen data obtained from the screen data document, wherein the second screen data obtained from the screen data document comprises a second screen template data and a second set of discrete screen data, and wherein the second screen template data specifies which screen template of the set of screen templates is used for displaying the second set of discrete screen data; and
modify the first screen data for the first screen template based on a user selection for the second screen subsequently generated.

17. The computer implemented system of claim 16 wherein modifying the first screen data for the first screen template modifies a navigation tree.

18. The computer implemented system of claim 16 wherein the screen data in the screen data document specifies a location where other screen data is obtained for the set of screen templates.

19. The computer implemented system of claim 16 wherein modifying the first screen data for the first screen template based on the user selection for the second screen subsequently generated modifies the generated first screen.

20. The computer implemented system of claim 16 wherein modifying the first screen data for the first screen template based on the user selection for the second screen subsequently generated modifies the determination of a next screen to generate.

* * * * *